United States Patent Office 3,490,494
Patented Jan. 20, 1970

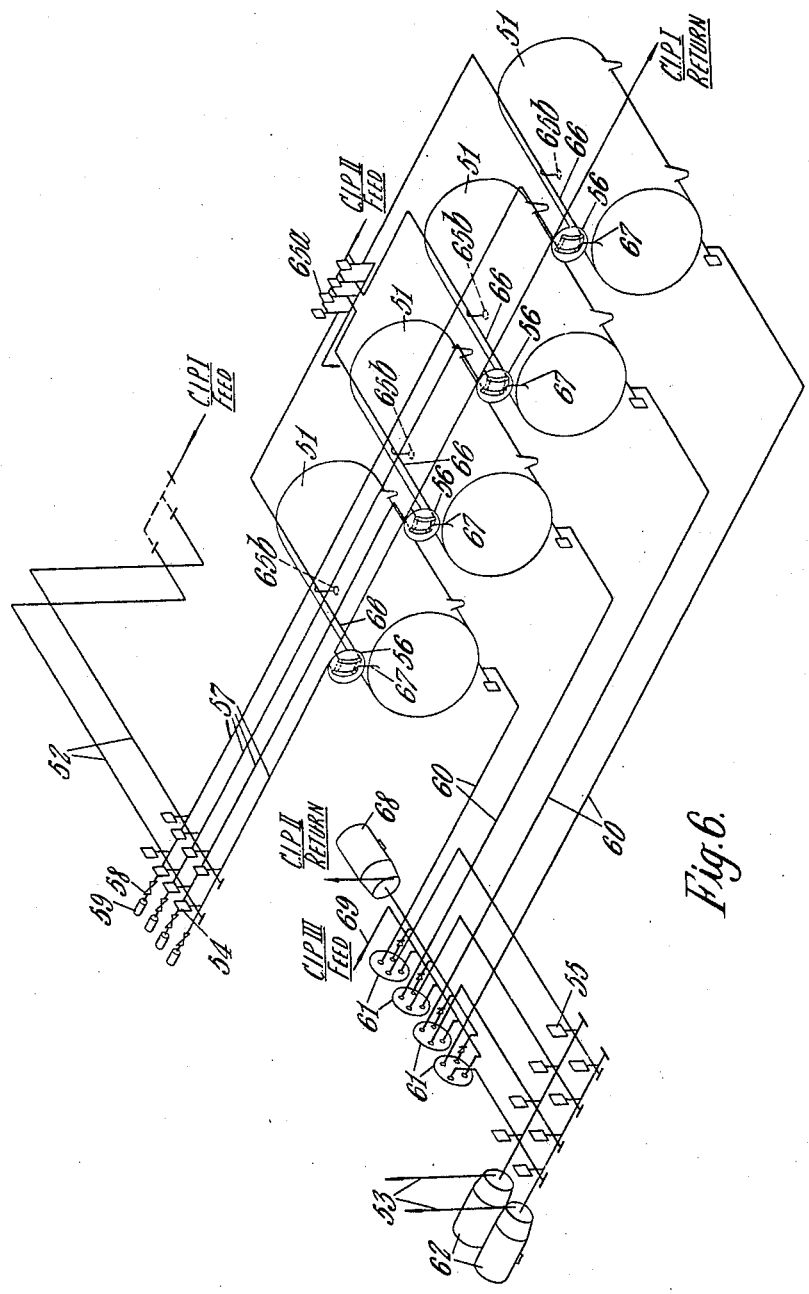

3,490,494
FLOW CONTROL DEVICES
Harry Christopher Cooper, Crawley, England, and Katsuto Okada, Tokyo, Japan, assignors to The A.P.V. Company Limited, Crawley, Sussex, England, a British company
Filed Feb. 3, 1966, Ser. No. 524,890
Claims priority, application Great Britain, Feb. 3, 1965, 4,624/65; Sept. 7, 1965, 38,245/65
Int. Cl. F17d 1/08, 3/00
U.S. Cl. 137—625.46                4 Claims

ABSTRACT OF THE DISCLOSURE

A flow changeover device for controlling the connection between external fluid conduits in which four fluid conduits are arranged to be connected to external fluid conduits. A pair of movable conduit sections serve for connecting the fluid flow connections together in pairs and means are included for moving the conduit sections to provide alternative interconnections between the fluid flow connections.

---

This invention relates to flow control devices, and also to a plant incorporating the same.

One form of cleaning arrangement for a food liquid processing plant includes the provision of dual cleaning circuits so that different portions of the plant may be cleaned with different cleaning fluids. In order to ensure that no portions of piping and no connections are left uncleaned, and also that the cleaning fluids are not intermixed during cleaning, it is necessary, when using conventional flow control valves, to run the two cleaning circuits at separate times.

It is an object of the invention to provide a flow control device which will enable the cleaning circuit to be used simultaneously without intermixing the fluids or leaving any section of the connecting arrangement uncleaned.

The invention consists in a flow changeover device comprising four fluid flow connections arranged to be connected to external flow conduits, a pair of movable conduit sections adapted to connect the fluid flow connections together in pairs and means for moving the conduit sections so as to provide alternative interconnections between the fluid flow connections.

Preferably, the fluid flow connections are arranged at the corners of a square, the movable conduit sections being rigidly joined with their ends lying at the corners of a similar square, the assembly of conduit sections being movable relative to the fluid flow connections about an axis through the centers of the two squares to bring the ends of the conduit sections into alignment with the fluid flow connections.

Conveniently, the assembly of conduit sections is bodily movable along the axis to move the ends into or out of mating connection with the fluid flow connections.

In one system of automated product control and in-place cleaning, electrical interlocks operated by switches on the valves are used to ensure that all valves in the cleaning circuit are correctly positioned before the cleaning solution enters. This safeguard, however, is not sufficient in itself to guarantee the cleaning solution will not leak into the product when the two are separated by a single valve. A damaged seat, for example, could allow a small seepage to take place. To guard against this possibility, systems are designed to ensure that the product pressure will always be higher than that of the cleaning solution, so that any leakage will be in the direction of the product into cleaning solution. To obtain a satisfactory pressure differential, however, frequently complicates the plan design.

In other systems, particularly those in use in the United States of America, the risk of mixing a cleaning solution with the product is eliminated by isolating the section of the plant being cleaned by disconnecting it manually from the remainder. However, due to the extensive use of manifolded air-operated valves, this restricts the cleaning which may be carried out during the time the product is being handled to the storage tanks alone, and the rest of the plant must then be cleaned together with a single operation. This involves leaving some of the plant dirty for long periods, which is undesirable due to the risk of bacterial growth. Furthermore, such systems using manual connections cannot be completely controlled from a central source, and are therefore not susceptible to complete automatic control.

The device according to the invention as set forth above may be used to provide an improved cleaning circuitry.

The invention further consists in a liquid processing plant divided into a plurality of stages connected to fluid flow connections of changeover devices as set forth above, with each changeover device being adapted, in one position, to interconnect adjacent stages and in the opposite position to connect the stages into appropriate cleaning circuits.

Each changeover device may incorporate an electrical switch to signal the position of the device to a central control system, thereby providing the necessary interlocking to ensure that the cleaning solution can only be fed into a stage when the flow changeover devices are correctly set.

In a particular embodiment of the invention, namely a milk pasteurization and bottling plant, the stages would comprise:

(1) Raw milk reception lines to a raw milk valve manifold, and lines from the manifold to raw milk storage tanks;

(2) Each raw milk storage tank individually in separate circuits, together with the associated outlet line;

(3) The raw milk tank outlet valve manifold and the lines therefrom to the pasteurization plant. The pasteurizing plant, the lines to the inlet manifold, the finished milk tanks and the finished milk tank inlet manifold;

(4) Each finished milk storage tank and its associated outlet line;

(5) The finished milk tank outlet valve manifold and the lines therefrom to the bottle-filling or cartoning machines per se.

The invention will be further described with reference to the accompanying drawings, in which:

FIGURE 6 is a diagrammatic representation of steps 1, 2 and part of step 3 of the preferred form of plant described above.

Figure 1:
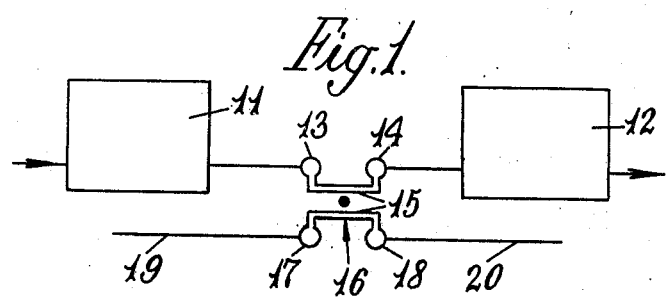
FIGURE 1 illustrates diagrammatically a processing apparatus incorporating a flow control device according to the invention in a process position.
Figure 2:
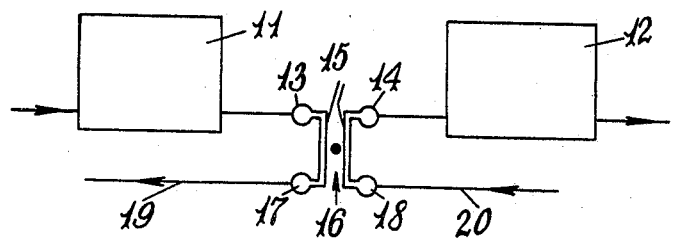
FIGURE 2 is a similar view showing the apparatus in a cleaning position.

Referring to FIGURES 1 and 2, these views show two processing stages 11 and 12 of a process plant, such as a U.H.T. milk processing plant provided with dual cleaning circuits. The circuit through which the product to be processed passes generally in the direction of the arrows of FIGURE 1. The product also passes through two fluid flow connections 13 and 14 and one U-shaped conduit section 15 of a flow control device 16 according to the invention. The device 16 also includes two further fluid flow connections 17 and 18 which are connected to lines 19 and 20 forming part of separate cleaning circuits for the stages 11 and 12. FIGURE 1 shows the arrangement in a process position with one section 15 forming a flow path between the connections 13 and 14 to provide for normal operation. FIGURE 2 shows the connection 18 operated to an alternative position in which the sections 15 interconnect the connections 13 and 17 and the connections 14 and 18 to include the process plant stages 11 and 12 in their separate cleaning circuits with lines 19 and 20 respectively.

Figure 5:
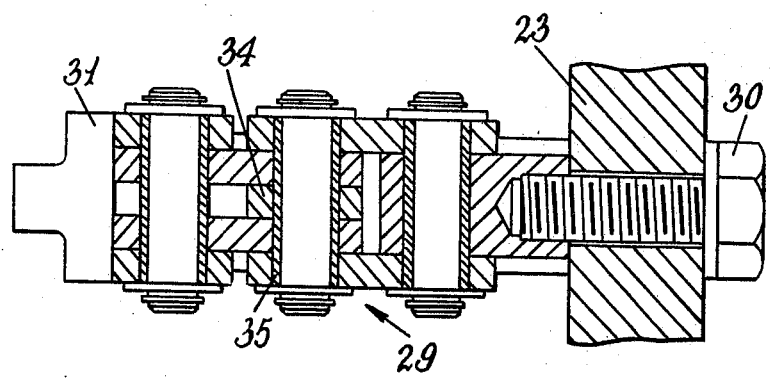
FIGURE 5 is a section on the line V—V of FIGURE 4.
Figure 3:
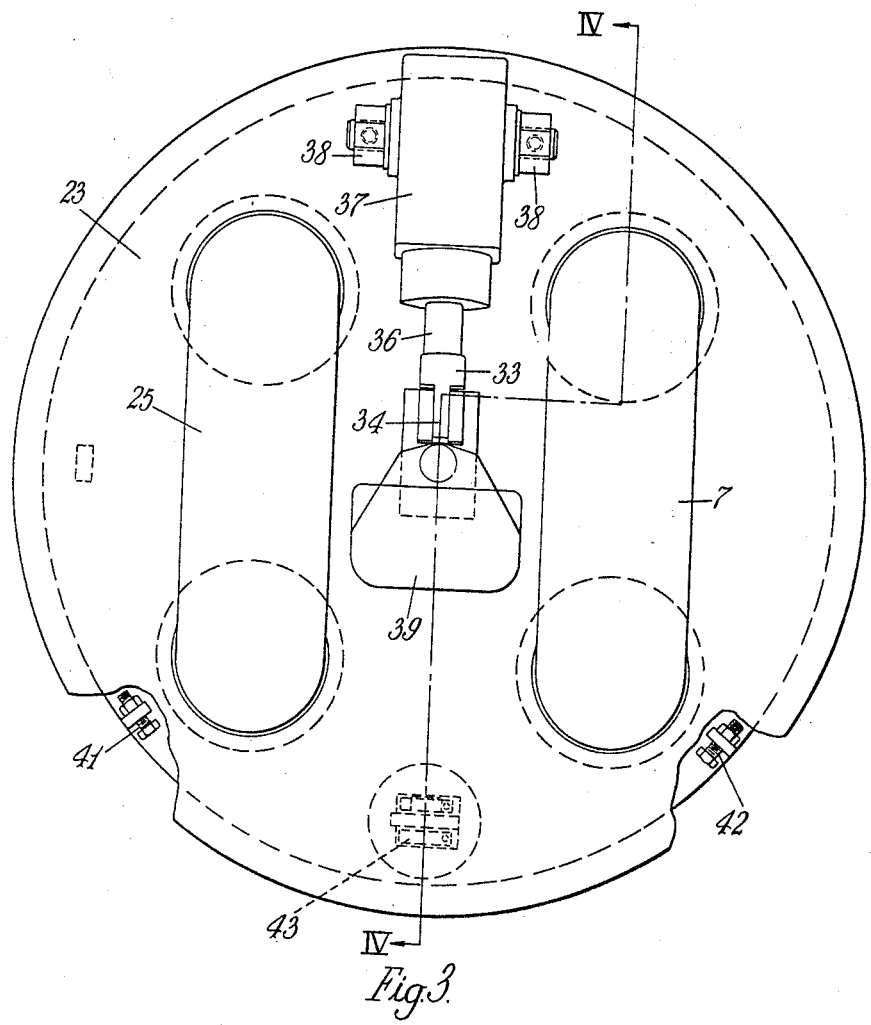
FIGURE 3 is an end element of a preferred form of changeover device or flow splitter according to the present invention.
Figure 4:
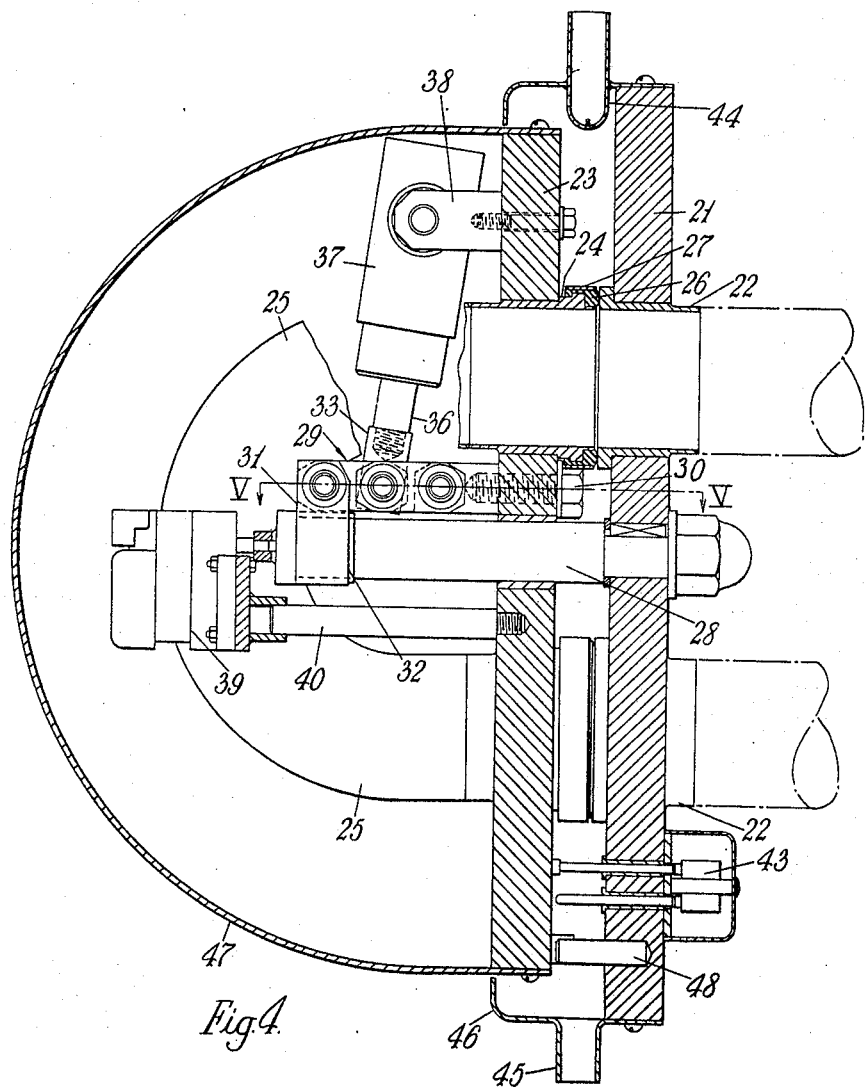
FIGURE 4 is a section on the line IV—IV of FIGURE 3.

FIGURES 3 to 5 show a preferred form of flow control device (a flow splitter). It comprises a fixed circular plate 21 having four fluid flow connections 22 therein located at the corners of a square in which a second circular plate 23 having fluid flow connections 24 is spaced correspondingly to the connections 22 and joined in pairs by bends 25. The connections 24 have rubber joints 26 at their ends to seat and seal against the connections 22. The joints 26 are held in place by metal rings 27.

The plate 23 is rotatably and slidably mounted on a spindle 28 secured and keyed in the plate 21. A toggle mechanism 29 has one end secured to the plate 23 by a bolt 30 and the opposite end secured to the spindle 28 by means of a shaft link 31 held in place against a shoulder on the spindle 28 by a circlip 32. A cylinder link 33 has a tongue 34 (see FIGURE 5) pivotally secured on the center bush 35 of the toggle mechanism. The link 33 is threaded into a piston rod 36 of a double acting pneumatic piston cylinder unit 37 pivotally mounted between brackets 38 attached to the plate 23. Energizing the unit 37 in one direction causes the joints 26 to be pressed hard and sealingly against the end flanges of the connections 22. Energizing the unit 37 in the opposite direction causes the plates to be moved apart by a short distance, e.g. ⅛ inch, to clear the connections 22 and 24 and enable the ring 27 to be rotated through 90° by means of a vane type pneumatic actuator 39 acting on the plate 23 by a guide rod 40. Adjustable stops 41 and 42 abut the stop 48 on the plate 21 to determine the limits of rotation of the plate 23.

Switches 43 are also incorporated to provide remote signals on the position of the device and similarly switches are used to sense the axial position of the plate 23. These switches may be used to operate electrical interlocking devices which ensure that the connections are correctly made before fluid is allowed to enter the circuit.

Means are provided to enable the device to be rinsed out after the position of the connections has been changed so that any drops of product can be removed. This is done by passing rinse water or cleaning solution through a spray 44 and removing the same through a connection 45 which is located in a shroud 46.

The mechanism is protected by a transparent plastic cover 47.

In the arranegment illustrated in FIGURE 6, four milk storage tanks 51 are connected to two milk inlet lines 52 and two milk outlet lines 53. The connection to each tank is made through manifolds of air-operated valves 54, 55, which would consist of A.P.V. Zephyr valves, type A.3 or similar valves. The purpose of the valve manifolds is to enable any line 52 or 53 to be connected to any tank 51. At the entry to each tank a flow splitter 56 is positioned so that inlet line 57 from the manifold can be completely drained of milk by gravity by opening a corresponding vent valve which admits air through the filters. On the outlet side of the tanks, lines 60 connect through further flows splitters 61 to the valves 55 and the arrangement is such that the tanks will drain by gravity to an extraction pump 62.

The flow splitters are preferably as illustrated in the accompanying drawings.

When the reception of milk is finished, the inlet lines 52, the inlet valves 54 and corresponding manifold, and the lines 57 to the storage tanks, which together comprise Stage 1 of the plant, may be cleaned at the same time.

We claim:

1. A flow changeover device for controlling the connection between external flow conduits comprising four fluid flow connections arranged at the corners of a square and adapted to be connected to the external flow conduits, a pair of movable conduit sections rigidly joined together and having ends lying at the corners of a square similar to said square and adapted to connect the fluid flow connections together in pairs, said conduit sections being movable about and along an axis through the centers of the two squares to bring the ends of the conduit sections into alignment with the fluid flow connections and to move the ends into or out of mating connection with the fluid flow connections and to provide alternative interconnections between the fluid flow connections; the improvement that the device comprises a fixed plate in which fluid flow connections are mounted, a spindle supported by the plate axis, coaxially with said axis passing through the center of the squares, the movable conduit sections being supported on said spindle for movement along and about said axis, and power operated means for moving the conduit sections about and along said axis, said power means including a driving element and a toggle mechanism adapted to transmit movement of the driving element as axial movement to the assembly of conduit sections.

2. A flow changeover device for controlling the connection between external flow conduits comprising four fluid flow connections arranged at the corners of a square and adapted to be connected to the external flow conduits, a pair of movable conduit sections rigidly joined together and having ends lying at the corners of a square similar to said square and adapted to connect the fluid flow connections together in pairs, said conduit sections being movable about and along an axis through the centers of the two squares to bring the ends of the conduit sections into alignment with the fluid flow connections and to move the ends into or out of mating connection with the fluid flow connections and to provide alternative interconnections between the fluid flow connections; the improvement that the device comprises a fixed plate in which fluid flow connections are mounted, a spindle supported by the plate axis, coaxially with said axis passing through the center of the squares, the movable conduit sections being supported on said spindle for movement along and about said axis, power operated means for moving the conduit sections about and along said axis, and signal switches adapted to be operated by movement of the movable conduit sections.

3. A flow changeover device for controlling the connection between external flow conduits comprising four fluid flow connections arranged at the corners of a square and adapted to be connected to the external flow conduits, a pair of movable conduit sections rigidly joined together and having ends lying at the corners of a square similar to said square and adapted to connect the fluid flow connections together in pairs, said conduit sections being movable about and along an axis through the centers of the two squares to bring the ends of the conduit sections into alignment with the fluid flow connections and to move the ends into or out of mating connection with the fluid flow connections and to provide alternative interconnections between the fluid flow connections; the improvement that the device comprises a fixed plate in which fluid flow connections are mounted, a spindle supported by the plate axis, coaxially with said axis passing through the center of the squares, the movable conduit sections being supported on said spindle for movement along and about said axis, power operated means for moving the conduit sections about and along said axis and, said power means including means for rinsing the free space adjacent to the fluid flow connections and lying outside the conduits and conduit sections themselves.

4. A flow changeover device for controlling the connection between external flow conduits comprising four fluid flow connections arranged at the corners of a square and adapted to be connected to the external flow conduits, a pair of movable conduit sections rigidly joined together and having ends lying at the corners of a square similar to said square and adapted to connect the fluid flow connections together in pairs, said conduit sections being movable about and along an axis through the centers of the two squares to bring the ends of the conduit sections into alignment with the fluid flow connections and to move the ends into or out of mating connection with the fluid flow connections and to provide alternative interconnections between the fluid flow connections; the improvement that the device comprises a fixed plate in which fluid flow connections are mounted, a spindle supported by the plate axis, coaxially with said axis passing through the center of the squares, the movable conduit sections being supported on said spindle for movement along and about said axis, and power operated means for moving the conduit sections about and along said axis, said power means including a vane type pneumatic actuator to impart rotary movement to the assembly of conduit sections about the said axis.

References Cited

UNITED STATES PATENTS

| | | | |
|---|---|---|---|
| 1,468,502 | 9/1923 | Keller | 251—56 X |
| 2,326,686 | 8/1943 | Rutledge | 251—56 X |
| 3,114,393 | 12/1963 | Vlasic | 137—625.18 |

M. CARY NELSON, Primary Examiner

WILLIAM R. CLINE, Assistant Examiner